Figure 9:
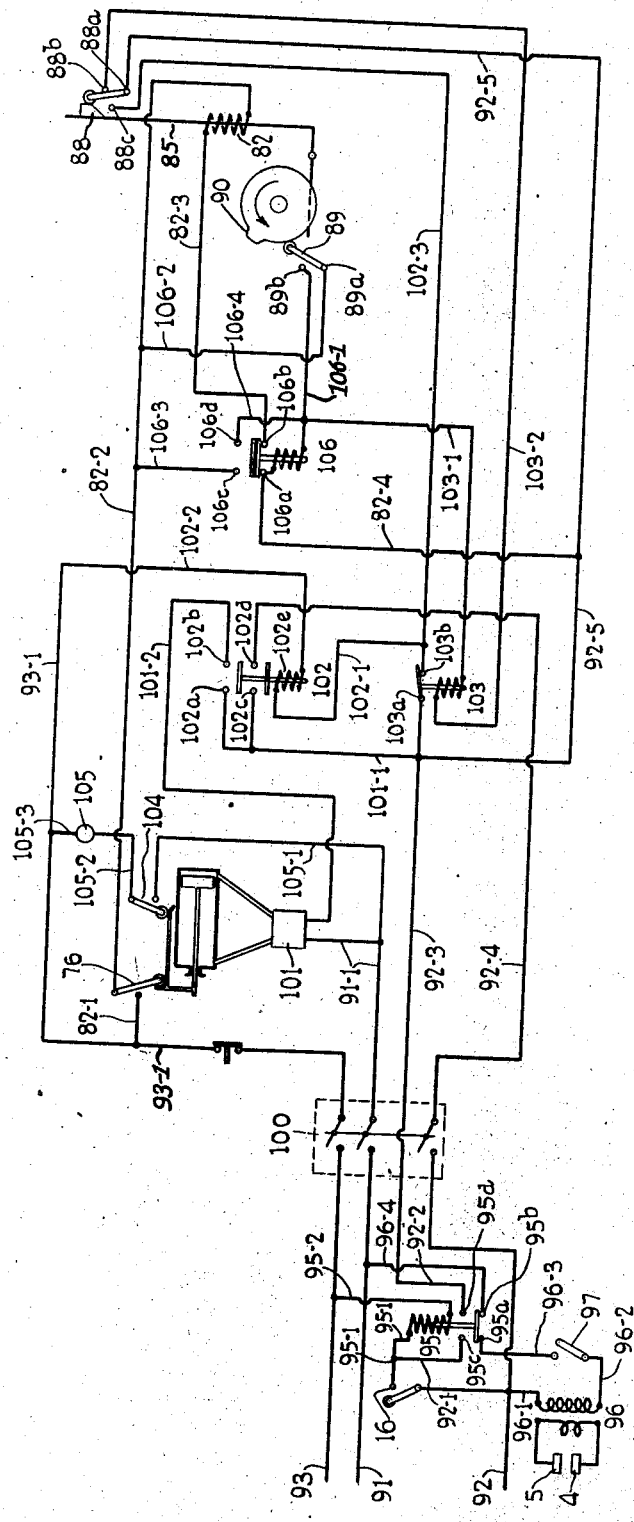

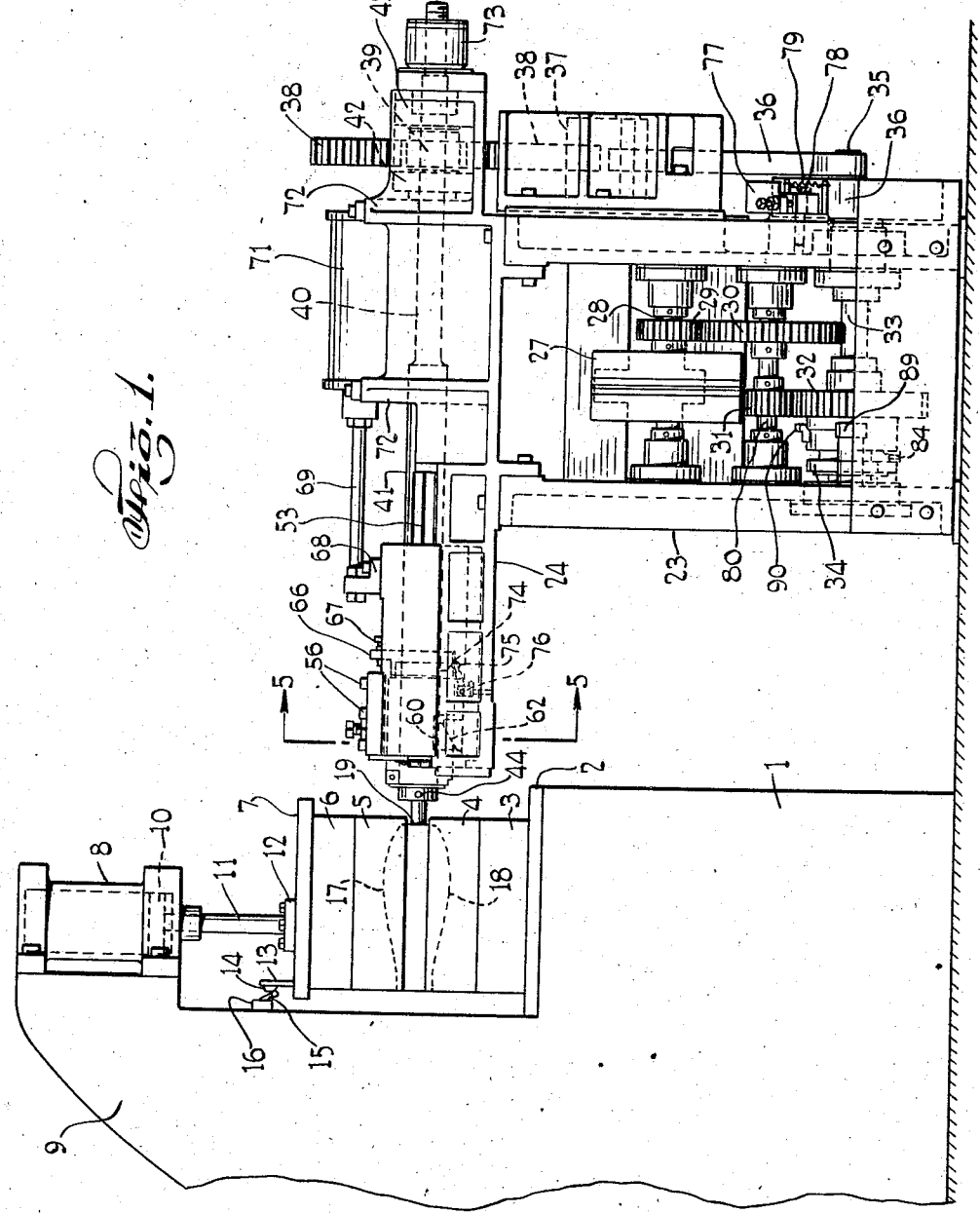

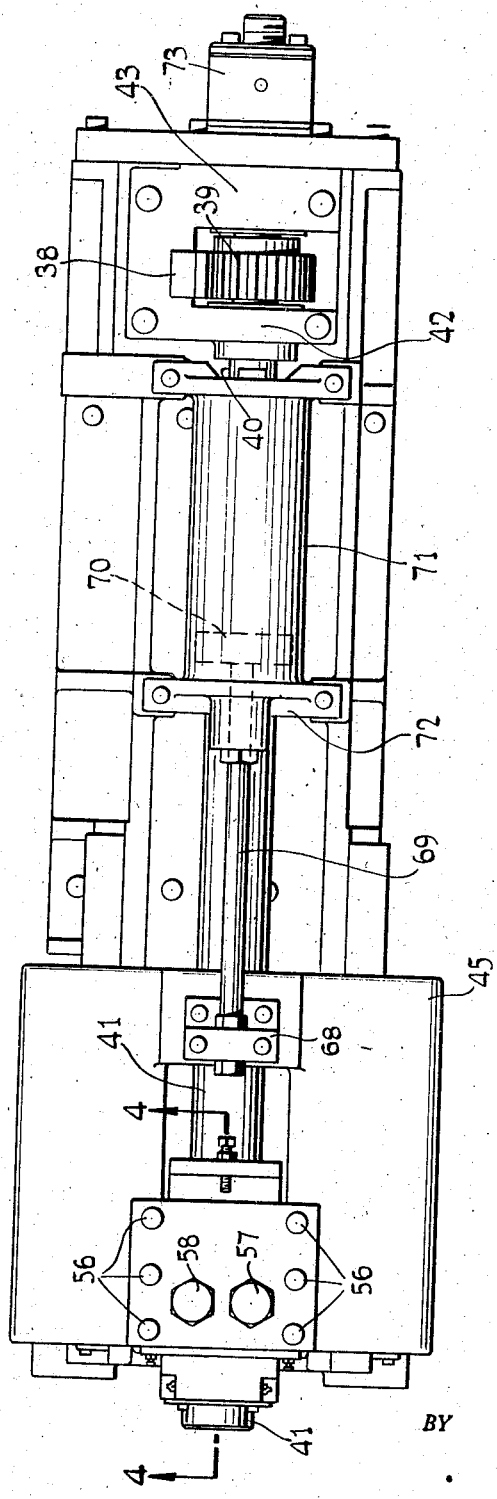

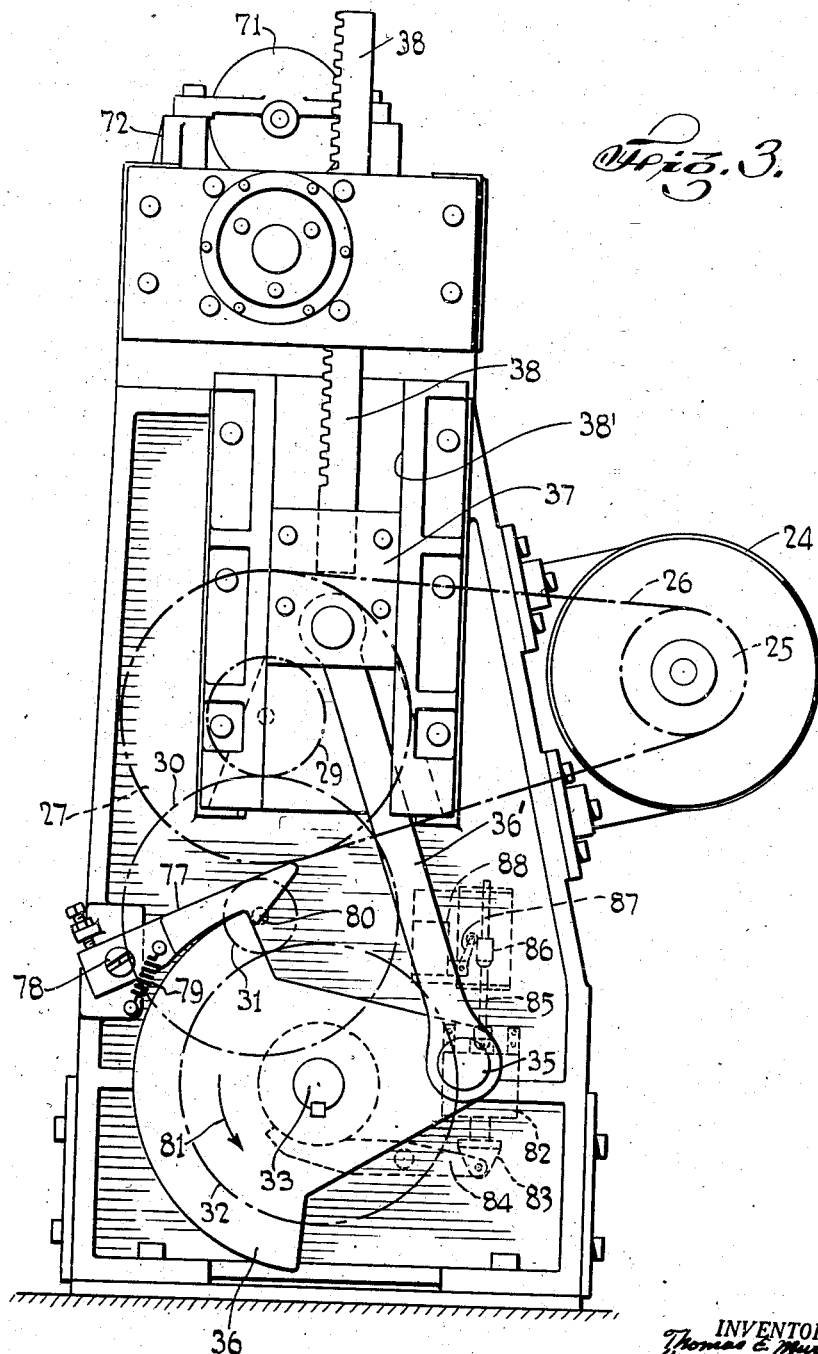

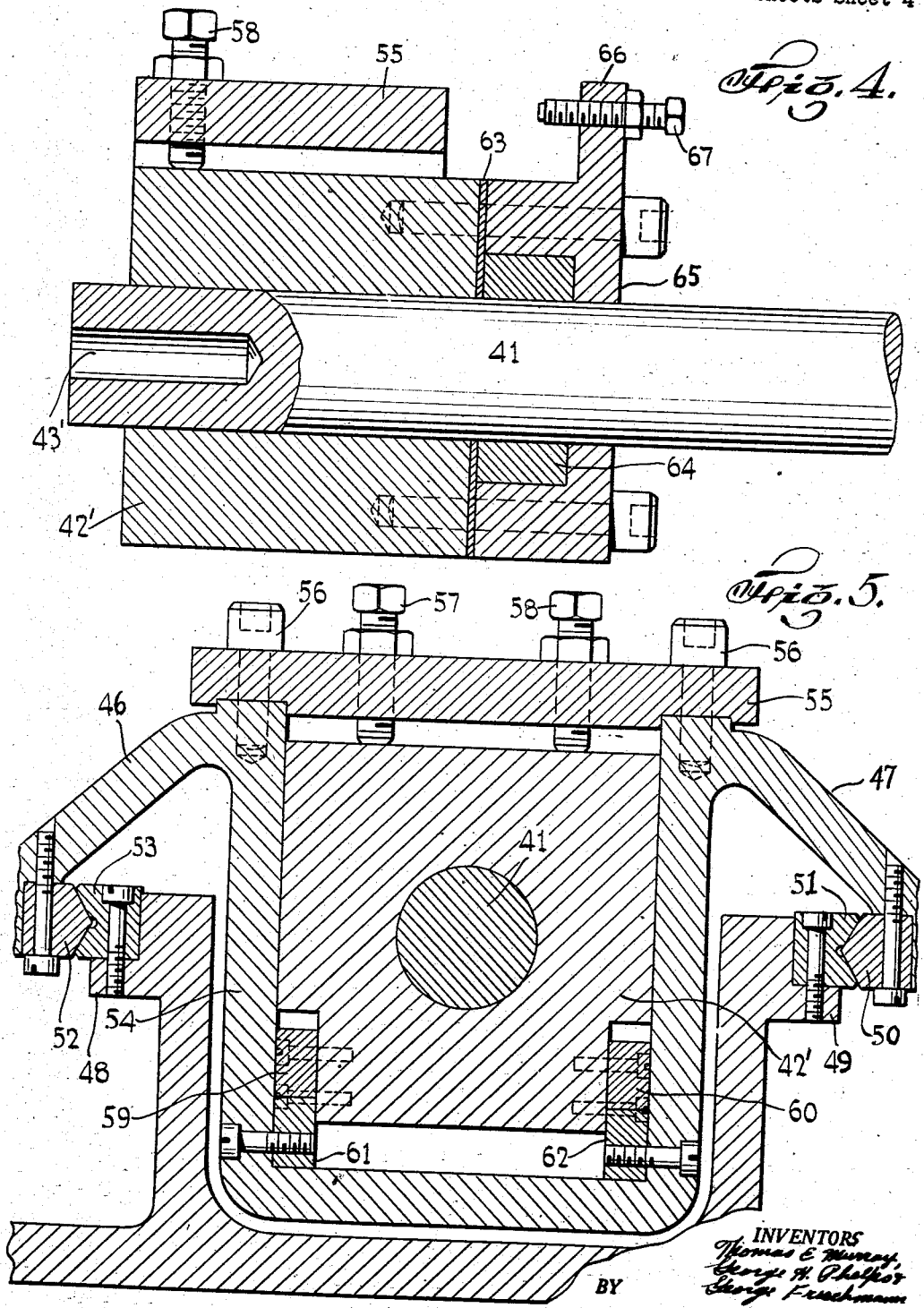

July 2, 1946.  T. E. MURRAY ET AL  2,403,229
ELECTRIC RESISTANCE WELDING
Filed Feb. 12, 1942  6 Sheets-Sheet 5
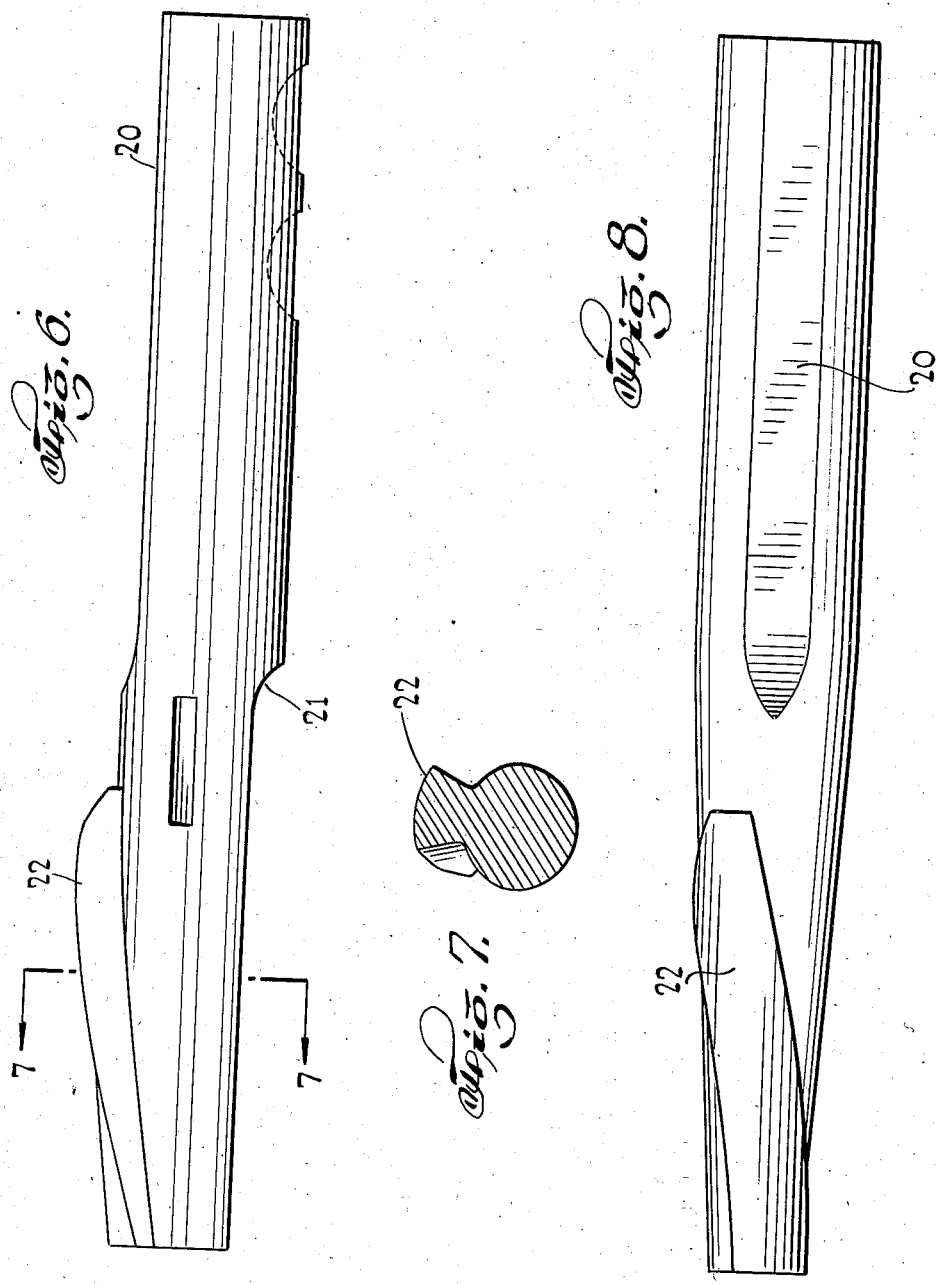

Patented July 2, 1946

2,403,229

UNITED STATES PATENT OFFICE 2,403,229

ELECTRIC RESISTANCE WELDING

Thomas E. Murray, Southampton, George H. Phelps, Floral Park, and George Frischmann, Queens Village, N. Y.; said Murray assignor to Yarrum, Incorporated, Brooklyn, N. Y., a corporation of New York, and said Phelps and Frischmann assignors to Murray Manufacturing Corporation, Brooklyn, N. Y., a corporation of New York Application February 12, 1942, Serial No. 430,524

4 Claims. (Cl. 29—33)

The invention herein disclosed relates to electric resistance welding and comprehends a method and apparatus for effecting a weld and trimming the extruded burr.

In electric resistance or a flash welding of two pieces of metal, the pieces are heated, in the weld area, by the passage of a heavy electric current therethrough. When the pieces are heated to a point where the metal in the weld area becomes plastic, the pieces are moved together beyond the contact plane to cause the metal of each piece to flow into and become ingrained in metal of the other piece. The excess metal is extruded laterally in the form of a burr. This burr, except perhaps in some special cases, must be removed from the article that is formed by the welding of the pieces. When the metal of the burr is cold, it is tough, and the removal of the burr often presents a difficult machining operation.

By this invention there is provided a method, and a machine for carrying out the method, by which the burr extruded at the joint is readily and quickly removed with a minimum amount of handling of the welded article. In accordance with the method of the invention, the burr is trimmed or removed while the metal is hot from the welding heat. The pieces of metal to be joined are placed between electrodes and a heavy current is caused to flow through the pieces in the area of the weld. When the metal becomes plastic, the pieces are forced together under heavy pressure and the welding current is cut off. Immediately thereafter and while the extruded burr is still hot from the welding heat, the burr is trimmed.

Preferably, though not necessarily, the burr is trimmed while the welded pieces remain between the electrodes. Also, it is advantageous to effect the trimming of the burr mechanically and in coordination with the action of the welding operation. To this end, there is provided, by this invention, a machine which effects the weld and trims the burr immediately upon the completion of the welding operation and while the burr is hot from the welding heat.

One specific embodiment of the machine forming a part of the invention is disclosed in the accompanying drawings. This machine together with its operation in performing the steps of one embodiment of the method of this invention is described in detail below. From this description a clearer understanding of the invention may be had.

The drawings include:

Fig. 1 which is a side elevation of a machine, part of the machine being illustrated somewhat diagrammatically.

Fig. 2 which is a plan of the trimming portion of the machine.

Fig. 3 which is an end elevation of the trimmer.

Fig. 4 which is a section taken along the line 4—4 of Fig. 2.

Fig. 5 which is a transverse, sectional elevation taken along line 5—5 of Fig. 1.

Fig. 6 which is a side elevation of a cutting tool.

Fig. 7 which is a transverse section taken at 7—7 of Fig. 6.

Fig. 8 which is a plan of the cutting tool; and

Fig. 9 which is a diagrammatic representation of the control for the mechanism.

In general, the machine illustrated in the drawings includes mechanism which effects the weld and trims the burr while the burr is still hot from the welding heat. Part of the mechanism for effecting the weld is illustrated at the left of Fig. 1. This mechanism, which is illustrated somewhat diagrammatically may be in general similar to welding machines of this kind that have heretofore been used and that are well known in the art. Preferably, however, the welder may take the form of that which is disclosed in the copending application of George J. Frischmann et al., filed January 22, 1942, Serial No. 427,730.

The welder illustrated in the drawings includes a base or frame 1 on which there is secured a bed plate 2 that carries an electrode shoe 3. Secured in the electrode shoe, there is an electrode 4. Cooperating with the electrode 4, there is a movable electrode 5, that is secured in an electrode shoe 6. The electrode shoe 6 is in turn secured to a movable ram plate 7, mounted for vertical movement toward and away from the electrode 4.

The ram plate 7 is mounted in guides (not shown) and may be moved from the position shown to a position spaced from the electrode 4. For the purpose of moving the ram plate 7, there is provided a hydraulic cylinder 8 which is secured to an extension 9 on the base 1. Within cylinder 8, there is a piston 10 to which there is secured a piston rod 11. The end of the piston rod is provided with a flange 12 that is secure to the ram plate 7. Suitable hydraulic connections are made to the cylinder on opposite sides of the pistons to effect movement of the piston in the cylinder. The ram plate 7 carries a control rod 13 upon which there is mounted a control cam 14.

The cam 14 serves to actuate the lever 15 of a limit switch 16 that is secured on the base extension 9. Lever 15 of the limit switch is provided with a cam follower which is normally in the path of the cam 14.

The particular electrodes 4 and 5 that are illustrated are for longitudinally divided, semi-sections 17 and 18 of a hollow article. Each electrode is provided with a depression that is complementary to the semi-sections that are to be joined by welding. In making an article such as is formed by welding the sections 17 and 18 together, the edges of the sections 17 and 18 are placed together with the section 18 within the electrode 4, the electrode 5 being raised and spaced from the electrode 4. The electrode 5 is then brought down to engage the section 17 and effect a pressure contact between the edges of the sections 17 and 18. In this position, the electrodes 4 and 5 are in circuit so that current flows through the sections 17 and 18 in the weld area, i. e. the area between the electrodes. In this way the pieces are heated in the weld area until the metal becomes plastic and will flow. Upon slight movement of the electrode 5, additional pressure is applied to cause the metal of each piece to flow into and become ingrained in the metal of the other piece. As the added pressure is applied and the electrode 5 moves toward the electrode 4 to effect the fusion of the metal of the sections, the cam 14 acts upon lever 15 to actuate the limit switch 16 for a purpose that will hereinafter appear. Suitable limit blocks are provided between the electrodes 4 and 5 to limit the amount of the take up as the weld is effected. In the take up as the weld is effected metal is extruded at the joint and forms a burr. In the welding of hollow articles, such as that disclosed, part of the metal is extruded inwardly forming an inwardly extending burr.

The trimming mechanism disclosed is for the purpose of removing the burr extending inwardly in an article such as that which is formed by the welding of sections 17 and 18. It will be observed that in such an article the opening thereto indicated at 19, is of a lesser diameter than the body of the article. For the trimming of the internal burr on such an article a particular trimming tool is utilized. A suitable tool for this purpose is shown in Figs. 6 to 8 inclusive.

The tool illustrated consists of a shank, shaped as illustrated, under-cut at 21, and the tool proper. The tool includes a cutter 22. This cutter is of the general shape of the interior of the hollow article that is formed by the welding of the sections 17 and 18. It extends longitudinally, but, as illustrated in Fig. 8, in a smooth curve making an angle with a diametrical plane. Each side of the cutter in the tool illustrated, forms a cutting edge. In view of the fact that the opening 19 of the welded article is of lesser diameter than the body of the article and that the radius of the cutter is, in part, greater than the radius of the opening 19, the tool must enter the article with its axis out of line with the axis of the article. When entered in the article, the tool must be shifted so as to be substantially coaxial with the article, in which position the cutter engages the interior surface of the article. The tool is then rotated first in one direction to trim the burr on one side and then in the other direction to trim the burr on the other side. In trimming the burr in an article of this kind it is preferable to rotate the tool in the opposite directions for the reason that when one burr is cut from one side of the article this burr leads the tool and if the tool continues to rotate in the same direction the severed burr would be between the tool and the burr on the opposite side.

The mechanism for operating the cutting tool is illustrated in Figs. 1 to 5. This mechanism includes a base 23 upon which a frame 24 is mounted. On the base 23 there is mounted an electric motor 24, the pulley 25 of which is connected by a belt 26 to a pulley 27 secured to a shaft 28 mounted in bearings on the sides of the base 23. Within the base a train of reduction gears including gears 29, 30 and 31 effect a driving connection between the shaft 28 and a gear 32 rotatably mounted on a shaft 33. The gear 32 is coupled to the shaft 33 through a clutch 34. In the particular machine illustrated, the clutch 34 is of the kind known as a one rotation clutch. Such clutches are well known in the art and this particular clutch is not, therefore, illustrated in detail. On the end of the shaft 33, there is mounted a crank 35 which is provided with a counterweight 36. The crank 35 is connected by a link 36 to a cross head 37, the cross head 37 being slidably mounted in a guide 38' secured to the side of the base 33. Also connecting to the cross head there is a rack 38 which engages a pinion 39 that is splined on the reduced end 40 of a shaft 41.

The shaft 41 extends longitudinally of the frame 24. At its reduced end the shaft 41 is journaled in bearings 42 and 43 which have a certain amount of play so that the shaft 41 may be tilted at slight angle to the horizontal. The shaft is also rotatably mounted in a square bearing block 42'. The end of the shaft is provided with a tool seat 43' which receives the shank 20 of the tool. The shank of the tool and the tool seat in the shaft are provided with complementary keys and keyways that serve to prevent the shaft from rotating with respect to the tool. Also set screws 44 are provided for securing the tool in the shaft against relative longitudinal movement.

The square bearing block 42 is slidably mounted in a carriage 45 that is in turn slidably mounted on the frame 24. The carriage 45 includes extensions 46 and 47 that overlie brackets 48 and 49 on the frame. The extension 47 and bracket 49 carry complementary gibs 50 and 51; similar complementary gibs 52 and 53 are carried by the extension 46 and the bracket 48. These gibs serve to slidably mount the head on the frame. The carriage includes a rectangular box-like section 54 in which the square bearing block 42 is received. The section 54 is provided with a cover plate 55 which is secured thereto by screws 56. There are two set screws 57 and 58 extending through the cover which serve to limit movement of the bearing block 42 in a direction towards the cover. The bearing block has secured thereto on each side thereof wedge-shaped cams 59 and 60 which cooperate with wedge-shaped cams 61 and 62 secured to the carriage and positioned to engage the cams 59 and 60 upon forward longitudinal movement of the carriage with respect to the square bearing.

Behind the square bearing 42, there is mounted on the shaft 41 a thrust plate 63. Against this thrust plate there is a steel collar 64 that is shrunk on the shaft. Surrounding the steel collar 64 there is a bronze retainer 65 which is secured to the square bearing by bolts. The bronze retainer 65 is provided with an extension 66 through which a set screw extends. The limit screw 67 is in position to engage the edge of the cover 55 upon relative rearward movement of the carriage with respect to the square bearing.

The carriage 45 is provided with an extension 68 to which the end of a piston rod 69 is secured. This piston rod 69 extends from a piston 70 that is slidably mounted in a cylinder 71. The cylinder 71 is secured to brackets 72 on the frame 24. Preferably, the piston is acted upon by air under pressure.

In Figs. 1 and 2 the shaft 41 is shown in the operative position, i. e. the forward position; the inoperative position is that in which the carriage 45 is drawn to the right from the position shown in Figs. 1 and 2. When a weld is effected, in the manner hereinafter disclosed, air is admitted to the head end of the cylinder 71, behind the piston 70, and moves the carriage 45 to the left, to the position shown in Figs. 1 and 2. The square bearing and the shaft 41 are moved with the carriage until a collar 73, mounted on the extended reduced end of shaft 41, engages the end of the adjacent bearing. Further forward movement of the shaft 41 and the bearing block are thus restrained. The carriage, however, moves further and in doing so, the cams 61 and 62 engage the cams 59 and 60 and raise the square bearing in the carriage until it engages the limit screws 57 and 58. Thus the tool is entered in the article between the electrodes axially out of line with the axis of the article, and when inserted it is raised to substantial axial alinement. When the tool is entered into the article and the shaft is raised, the edge of the tool is brought into contact with the inner surface of the article.

At this point a cam 74 on the carriage 45 has engaged a cam follower 75 and actuated a switch 76. Actuation of the switch 76 effects actuation of the clutch 34 and thus rotation of the crank 35. Upon rotation of the crank 35 and reciprocation of the rack 38 the shaft 41 is caused to rotate a partial revolution in one direction, then in the opposite direction and returned to the original position. While the mechanism disclosed utilizes a one rotation clutch, it may be desirable, in some instances, to utilize a clutch that makes two or more revolutions before disengaging. Several movements of the cutter across the joint may, in some instances, leave a smoother surface at the joint.

The shaft 33 overrides, slightly, the one revolution. The rack and cross head, however, overbalance the counterweight and tend to move to the lowermost position. Such action is prevented and the shaft 33 positioned as desired by a lever 77 that is pivotally mounted on the frame as at 78. A spring 79 acts to urge the lever 77 towards the counterweight 36. The lever is provided with a hook-shaped end 80 which engages the edge of the counterweight 36. In operation the shaft 33 rotates in the direction of the arrow 81. As it passes the hook-shaped end of the lever 77, the lever falls in the place so that upon reverse movement under the weight of the rack and cross head the lever engages the counterweight and positions the shaft 41 in the proper position for removing the tool. Air is then admitted to the piston rod end of the cylinder and the head end is connected to atmosphere. The carriage moves away from the electrodes. In its initial movement the square bearing 42, shaft 41 and the tool are lowered and then the tool is withdrawn.

The clutch is actuated through a solenoid 82, the plunger 83 of which acts upon a clutch lever 84. Also actuated by the solenoid 82 through the plunger 83, there is a control rod 85 which carries a cam 86. The cam 86 is mounted on the control rod in position to actuate a lever 87 of a switch 88 that is mounted upon the base. Another switch 89 mounted upon the base is actuated, upon the rotation of the shaft 33 by a cam 90 that is secure to the section of the clutch which is secured to and rotates with the shaft 33.

The controls, and their interconnection, for the machine above described are illustrated diametrically in Fig. 9. In Fig. 9 there is illustrated a source of electric current consisting of the line wires 91 and 92 and the neutral 93.

Upon actuation of limit switch 16, two things occur directly. The welding current is cut off and the normally open circuit to the trimming mechanism controls is closed. In circuit with the normally open switch 16 is the coil of a relay 95. This relay includes normally closed or bridged contacts 95a and 95b which are in circuit with the primary of the transformer 96, the secondary of which is connected, during the welding operation, to the electrodes 4 and 5. The circuit to the coil 95 includes line wire 92, switch 16, a wire 95—1, coil 95, a wire 95—2 and line wire 93. Upon actuation of the relay 95, the connection between contacts 95a and 95b is broken thus opening the circuit to the primary of the transformer, which circuit includes line wire 92, a wire 96—1, transformer primary, a wire 96—2, a switch 97, a wire 96—3, contacts 95a and 95b, a wire 96—4 and line wire 91. The switch 97 may be either a circuit breaker, a manually operated or magnetically operated switch to suit any particular condition; it is, however, closed during the welding operation. This circuit is preferably tied in with the circuit of the aforesaid application Ser. No. 427,730, filed January 22, 1942, so that as here, the welding current must be cut off before the circuit to the trimming mechanism controls are completed.

When the relay 95 is energized as above described it bridges contacts 95d and 95c. This action connects the line wire 92 to a wire 92—3. The connection is effected through the switch 16, wire 95—1, a wire 92—1 contacts 95c and 95d, and a wire 92—2. In this manner the welding current is cut off and the line wires connected through to the trimmer controls, the neutral 93, line 91 and a branch of 92 (hereinafter described) being connected through a three pole manually operated switch 100.

The first action is to effect, through the control of the pneumatically operated piston, the forward movement of the tool. This action is controlled by a valve 101. The valve is of a kind well known in the art and it is normally positioned by a spring to connect the head end of the cylinder to exhaust and the opposite end to air under pressure. The valve is magnetically actuated to reverse these connections, that is, when energized the valve is actuated to connect the head end of the cylinder to air under pressure and the opposite end to exhaust or atmosphere. In this position of the valve the piston moves forward and moves the tool to operative position.

Energization of the air valve is directly controlled by a normally open relay 102 having two pair of cooperating contacts 102a, 102b and 102c, 102d. The coil 102e of the relay 10 is energized directly upon operation of relay 95. The circuit to the relay includes line 92, switch 16, relay contacts 95c and 95d, line connected wire 92—3, contacts 103a and 103b of a normally closed time relay 103, a wire 102—1, coil 102e and a wire 102—2 to a line-connected wire 93—1 connected to the neutral line 93.

When the relay closes contacts 102a and 102b are bridged also contacts 102c and 102d are bridged. The circuit to the valve 101 includes the contacts 102a and 102b, this circuit includes the line connected wire 92—3, a wire 101—1, contacts 102a and 102b, a wire 101—2, air valve 101 and line connected wire 91—1. Thus on the bridging of the contacts 102a and 102b, the air valve solenoid is connected across the line wires 91 and 92. The valve is actuated against the biasing spring, and the piston moves forward in the cylinder. Immediately upon movement of the piston, a cam operated switch closes a circuit to a signal light 105, this circuit remains closed and the signal light lighted until the piston returns to its initial position. The circuit for this signal light includes line wire 91, a wire 105—1, switch 104, a wire 105—2, light 105 and a wire 105—3 which is connected between one side of the light and line-connected wire 93—1.

As explained above when the carriage or head is moved to its foremost position, the limit switch 76 is actuated. Upon actuation, a circuit is closed to the clutch solenoid 82. This circuit includes line-connected wire 93—1, a wire 82—1, switch 76, a wire 82—2, solenoid 82, a wire 82—3, contacts 106a and 106b of a relay 106, which contacts are normally bridged, and a wire 82—4 connected to a line-connected wire 92—5. Thus, the solenoid 82 is connected across the line wires 93 and 92.

With the energization of the solenoid 82, and the attendent operation of the clutch lever, the switch 88 is actuated. The switch 88 is a single pole double throw switch. With the solenoid 82 de-energized, this switch connects contacts 88a and 88b. When the clutch solenoid is energized and switch 88 is actuated, it connects contacts 88a with 88c, by-passes the contacts of the time delay relay 103 and opens the circuit of the time delay relay. When the contacts 88a and 88c are connected together, the line-connected wire 92—5 which is connected to the contact 88a is then connected to a wire 102—3 which is directly connected to the wire 102—1. Thus the energization of the relay 102 becomes, upon the actuation of the switch 88, independent of the time delay relay 103.

As the shaft 33 rotates, the cam 90 thereon is brought to a position, after predetermined movement of the shaft 33, to actuate the switch 89. Actuation of the switch 89, which is a normally opened switch, closes the switch to connect the contacts 89a and 89b thereof. This action closes a circuit to relay 106. The circuit to relay 106 includes the line-connected wire 92—5, wire 82—4, contact 106a to which one side the coil 106 is connected, wire 106—1 contacts 89a and 89b of switch 89, and a wire 106—2 connected to wire 82—2 which is connected through the switch 76 and wire 82—1, to the line-connected wire 93—1. In this manner, upon actuation of the switch 89, the relay 106 is operated to open the contacts 106a and 106b and to close contacts 106c and 106d. Upon opening contacts 106a and 106b, the solenoid 82 is de-energized and the clutch lever released. This action takes place immediately upon the clutch taking hold. The clutch remains engaged thereafter until it is automatically disengaged upon the completion of one revolution of the shaft 33.

When the relay 106 is energized, as previously stated, the contacts 106c and 106d are connected. By the connected contacts 106c and 106d a hold-in circuit is completed through the solenoid of the relay, this hold in circuit includes line-connected wire 82—2 a wire 106—3 contacts 106c and 106d, a wire 106—4, relay coil 106, wire 82—4, wire 92—5 and line-connected wire 92—3. Also by the bridging of the contacts 106c and 106d a circuit is completed to the solenoid of the time delay relay 103, this circuit includes wire 106—3, wire 106—4, a wire 103—1, solenoid of relay 103, a wire 103—2, contacts 88a and 88b to line-connected wire 92—5.

This time delay relay is set for a time which is in excess of the time for the complete cycle of operation of the trimming mechanism. As the switch 88 is, upon the release of the clutch lever by the de-energizing of the solenoid 82, now in position to connect contacts 88a and 88b, the circuit of the relay 102 again includes the normally closed contacts of the time delay relay. When the period of time for which the time delay relay is set passes, the time delay relay is actuated and the circuit to the relay 102 is broken. When this circuit is broken, the solenoid of the air valve 101 is de-energized and the valve is actuated by the spring acting thereon to connect the head end of the cylinder to atmosphere and the piston-rod end to air under pressure. The piston is thus moved rearwardly in the cylinder. As the piston starts to move the switch 76 is open and when it reaches the final rearward position the switch 104 is open. Thus, the shaft 33 has made one complete revolution and has come to rest when the time delay relay functions to withdraw the tool. Upon the opening of the switch 76, the relay 106 is, of course, de-energized and all of the relays and contacts re-established in their initial relation.

From the foregoing description of the mechanism disclosed in the drawings, it will be seen that by the starting of the mechanism the weld is effected and the burr trimmed automatically and in proper sequence. While the mechanism disclosed is capable of carrying out the method in the welding and trimming operation described, it will be apparent that simpler operations, such as the cutting of external burrs, or internally extruded burrs in cylindrical articles or articles in which the opening is larger than the diameter or body of the article may be readily effected by similar mechanism arranged for that particular purpose.

From the foregoing description of the method as related to welding the particular pieces illustrated and trimming the burrs on the welded piece, and of the mechanism suitable for carrying out the method, it will be apparent to those skilled in the art that by this invention pieces may be welded and the extruded burr trimmed in what amounts to a single operation. The burr is trimmed while the pieces remain in the electrodes and while the condition of the metal of the burr is most favorable for the trimming operation. This minimizes the effort necessary for the trimming of the burr and minimizes the necessary handling of the article.

It will be obvious that various changes may be made, by those skilled in the art, in the details of the steps of the method and the specific mechanism disclosed in the drawings and described above within the principle and scope of the invention as expressed in the appended claims.

What we claim is:

1. In a machine for effecting a weld by electric resistance welding, the combination comprising means for effecting a weld including electrodes for engaging the pieces to be welded, and means for removing the burr extruded during the welding including a cutting tool, a movably mounted tool holder, means for moving the tool holder towards the electrodes, means for moving the tool holder transversely of said movement towards the electrodes, and means for effecting angular movement of the tool holder.

2. In the process of electric resistance welding of two pieces of metal, the steps including engaging the pieces between electrodes, heating the pieces in the weld area by the passage of an electric current therethrough, forcibly moving the electrodes under pressure to cause the pieces to move together beyond the plane of contact thereof, cutting off the welding current and retaining the pressure on the electrodes and shearing the extruded burr while the piece is between the electrodes and the pressure is retained on the electrodes and while the burr is still hot from the welding heat.

3. In the process of forming a hollow article by electric resistance welding, the steps including engaging sectors of a hollow article between electrodes, heating the pieces in the weld area by the passage of an electric current therethrough, forcibly moving the electrodes under pressure to cause the pieces to move together beyond the plane of contact thereof, cutting off the welding current and retaining the pressure on the electrodes to clamp the welded piece, and inserting a tool within the welded piece clamped between the electrodes and shearing the internal burr while the metal is still hot from the welding heat.

4. In a machine for effecting a weld by electric resistance welding, the combination comprising means for effecting a weld including electrodes for engaging the pieces to be welded, means for removing the burr extruded during the weld and control means therefor for effecting operation thereof immediately upon completion of the weld, said burr removing means including a cutting tool, a movably mounted tool holder, means for moving the tool holder towards the electrodes, means for moving the tool holder transversely of said movement towards the electrodes, and means for effecting angular movement of the tool holder.

THOMAS E. MURRAY.
GEORGE H. PHELPS.
GEORGE FRISCHMANN.